(12) United States Patent
Laine et al.

(10) Patent No.: US 6,304,430 B1
(45) Date of Patent: Oct. 16, 2001

(54) SPACE SAVING MOBILE DEVICE

(75) Inventors: Merja Laine, Tampere; Anne Tamminen, Vuorentausta, both of (FI)

(73) Assignee: Nokia Mobile Phones, Espoo (FI)

( * ) Notice: Subject to any disclaimer, the term of this patent is extended or adjusted under 35 U.S.C. 154(b) by 0 days.

(21) Appl. No.: 09/427,209

(22) Filed: Oct. 26, 1999

(30) Foreign Application Priority Data

Oct. 28, 1998 (FI) .......................................... 982344

(51) Int. Cl.[7] ........................................ G06F 1/16
(52) U.S. Cl. .................... 361/625; 361/683; 361/727; 312/223.2; 429/54
(58) Field of Search ...................... 361/616, 625, 361/683, 684, 724–727, 687, 689–690; 312/291, 292, 223.2, 223.1; 200/50 A; 429/54, 82, 130, 138, 152–154, 161, 185; 455/11.1, 556, 557, 569, 572.9, 216; 364/705.05; 250/227, 229, 216, 228

(56) References Cited

U.S. PATENT DOCUMENTS

| | | | |
|---|---|---|---|
| 4,480,182 | * 10/1984 | Ely et al. | 250/227 |
| 4,680,724 | * 7/1987 | Sugiyama et al. | 364/708 |
| 4,876,441 | * 10/1989 | Hara et al. | 235/488 |
| 4,918,631 | * 4/1990 | Hara et al. | 364/708 |
| 5,004,655 | * 4/1991 | Symanski | 429/82 |
| 5,006,000 | * 4/1991 | House | 434/161 |
| 5,227,260 | * 7/1993 | Rose et al. | 429/54 |
| 5,474,457 | * 12/1995 | Bromley | 434/311 |
| 5,574,625 | * 11/1996 | Ohgami et al. | 361/684 |
| 5,731,963 | 3/1998 | Heiss et al. | 361/814 |
| 5,983,073 | * 11/1999 | Ditzik | 455/11.1 |
| 6,014,311 | * 1/2000 | Shin et al. | 361/684 |

FOREIGN PATENT DOCUMENTS

| | | |
|---|---|---|
| 3024579A1 | 10/1981 | (DE). |
| 266280A1 | 3/1989 | (DE). |
| 0296623A2 | 12/1988 | (EP). |
| 0 795 968 A2 | 9/1997 | (EP). |
| 2298387 | 9/1996 | (GB). |
| WO98/13980 | 4/1998 | (WO). |

OTHER PUBLICATIONS

Muovi–Plast Magazine, Paakkonen et al., issue 3/97, pp. 26–28(and English translation of the Abstract).
Branson Technical Notes No. 4, "Relative Welding Characteristics of Thermoplastics".

* cited by examiner

Primary Examiner—Leo P. Picard
Assistant Examiner—Michael Datskovsky
(74) Attorney, Agent, or Firm—Perman & Green, LLP

(57) ABSTRACT

A mobile device (20) in which, in order to make the device thinner, at least one of the walls belonging to its structure (23, 26) has for a part of its area been made of thin plastic foil in order to reduce the thickness of the device. The same plastic foil also facilitates the printing of the product markings on it, e.g. by using laser-marking, prior to fixing the plastic foil in place.

17 Claims, 2 Drawing Sheets

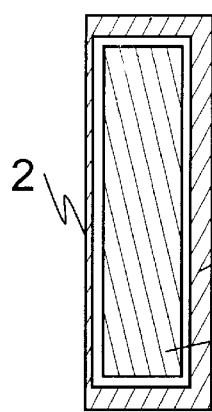
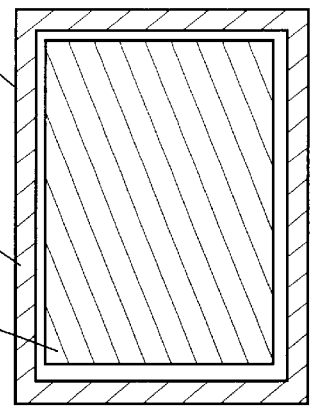
Fig. 1a  Fig. 1b
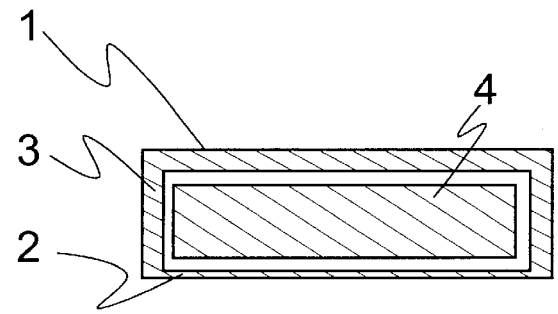
Fig. 1c
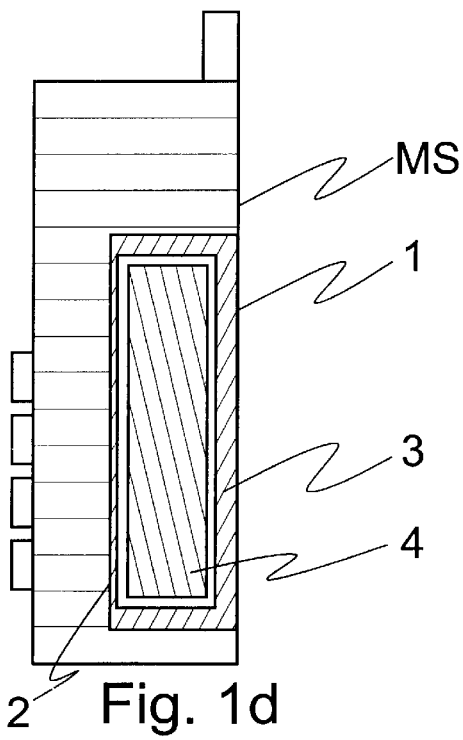
Fig. 1d

SPACE SAVING MOBILE DEVICE

FIELD OF THE INVENTION

The present invention relates to making the structure of mobile communication devices thinner.

BACKGROUND OF THE INVENTION

There are on the market a great number of various small hand-held mobile stations in which a battery can be used as a power supply. Previously, it was used mainly Ni—Cd (nickel-cadmium) batteries which were quite big and heavy, compared with their capacity. Lately they are being replaced by Ni—MH (nickel-metal hybrid) batteries and Li—Ion (lithium-ion) batteries, the capacity of which, as to size and weight, is better than that of Ni—Cd batteries. Simultaneously, the development of semiconductor technology has resulted in more compact mobile stations with lower power consumption, and it has been possible to further reduce the size of the batteries used in them.

As the thickness of the batteries used in mobile communication devices and other corresponding small devices has been reduced at its lowest to just a few millimetres, even the space required by their casing has changed from an insignificant factor to a more and more important element in regard with the size of a battery-operated device. In the first stage the thickness of battery walls could be reduced due to the reduced need of mechanical support because of the batteries being lighter, out of economic reasons, but in the newest and smallest devices it has been possible to choose even new materials and advanced manufacturing processes in order to minimize the size of the final product. In patent application publication EP 795 968 there is provided a solution for making the battery walls thinner, in which solution two of the plastic walls normally enveloping the battery cells are manufactured from thin steel foil. A construction made using two different materials is, however, slightly problematic in regard to the production technology and also in regard to the recycling at the end of the life span of the product. Additionally, if the metal surface remains visible on the outside of the product, its looks may differ from the otherwise plastic case of the product in an embarrassing way.

Thanks to the developments in battery and semiconductor technologies it has been possible to reduce the size of battery operated mobile stations without compromising the operating times of the devices. In spite of that it is desired to manufacture the future mobile stations even smaller and lighter, because they are intended to be continuously carried by their users. Of these devices particularly problematic in regard to the use of space are two-part folding devices of the PDA (Personal Digital Assistant) type, such as Nokia Communicator. It is difficult to reduce the thickness of such a device integrating the functions of a PDA and a mobile station, because inside the covers of a folded device there must be room for at least one, but preferably two displays, a keyboard comprising preferably a complete set of characters, the electronics of a mobile station and that of a PDA, and a battery. Yet, the keyboard should be large enough to be good to use and that in order to present the purposes of the keys the corresponding symbols can be printed in connection with the keys. An additional problem in integrating a PDA and a mobile station is that the power consumption normally is higher than that of only one of these and a battery facilitating a sufficient operating time is reasonably big. Naturally the same problem concerns also other hand-held devices, such as PDA-equipment, wireless telephones, mobile and wireless telephones provided with a flap, palmtop computers and laptop computers. It has been attempted make such devices thinner by designing the electronics to take up as little space as possible and by manufacturing the covers of the product as thin as possible whenever it can be done. For example, when using injection moulding technique the minimum thickness of a plastic component is determined by the flowing properties in a mould of the melted plastics, and when the flow-channel inside a mould is small enough, the plastics will no longer fill it and in such a point there will be a hole instead of a thin wall.

Further, devices sold in large series to consumers have to be provided with a marking of their origin and they are often provided with an individual serial number, by using which it is possible to track the manufacturing date and the machine among other things in order to avoid the misuse of warranty service and to make the detection of piratism easier. This has often been implemented by attaching in the case of a device a sticker, in which the required product data has been printed. A sticker is, however, exposed to wear and damage and it is relatively easy to forge into a pirate product.

SUMMARY OF THE INVENTION

Now such a mobile device has been invented, the size of which it has been possible to reduce by manufacturing part of its walls of thin plastic folio fixed to the surrounding thicker walls using for example ultrasonic welding. Particularly, by using the invention it is possible to make thinner such parts which increase the size of a mobile device, and in which the wall remains inside the outer case of the mobile equipment in transport position. Examples of such parts of a mobile device are the outer skin of the case of a mobile station and the walls of the battery of a mobile station, and out of the walls of the case of a mobile station particularly the side wall(s) remaining inside a two- or multi-part mobile station and the inner surfaces ending up against each other in a closed two-part mobile station that may e.g. envelope a display and a keyboard inside a device. The case of the battery of a mobile station can for example be manufactured of injection moulded plastic on five faces and on its sixth face of a thin plastic foil fixed to four side walls e.g. using ultrasonic welding. In that case the thin wall remains protected by the structure of the equipment. Respectively, walls enveloping the keyboard and display can be manufactured of thin plastic foil. The top cover of an unfolding two-part device can also be made of plastic foil and in this it is possible to form so-called membrane keys, in which case the space taken by the keys is clearly reduced and the outer surface of the device is easier to clean because of its smoothness, and dirt, dust and moisture are prevented from penetrating through any gaps in the keyboard. The same technique is also applicable to the lens of the display and to the keyboard plastic, leaving no gaps for dust and water. Additionally, the plastic foil can be manufactured to have a hard-facing, which increases the resistance to wear of the outer surface. Further, the plastic foil is preferably printed to include the required product data, in which case a device carries on its case all required information without a separate sticker. If plastic foil is used in the top cover, graphics can be printed on the inside of the plastic foil, in which case it is achieved good colouring possibilities and resistance to wear.

In another embodiment of the invention the wall of the case of a mobile station and the keyboard are made thinner by manufacturing the wall comprising the keyboard of thin plastic foil. The locations and symbols of the keys are printed in this foil e.g. using laser marking and switching means are grouped below the plastic foil under the marked key positions in order to detect the pressing of a key. In this way it is possible to improve the resistance against dirt and moisture of the keyboard. Such a keyboard requires very little space and is, additionally, neat and easy to clean, because next to the keys there will remain no such areas, which would be difficult to clean.

A mobile device according to the invention, comprising a case limiting a space of a certain shape and form, the case having a wall, is characterized in that said case comprises a first part and a second part which forms at least a part of the area of said wall, said first part is made of injection moulded plastic, said second part is made of plastic foil, and said second part has been fixed to said first part.

The case of a mobile device according to the invention, limiting a space of a certain shape and form, the case having a wall, is characterized in that said case comprises a first and a second part, which said second part forms at least a part of the area of said wall, said first part is made of injection moulded plastic, said second part is made of plastic foil, and said second part is fixed to said first part.

A method of manufacturing for the manufacturing of the case of a mobile device, which case limits a space of certain shape and size, and which case has a wall, is characterized in that a certain first part of the case is manufactured of plastic by injection moulding, a certain second part of the case is manufactured of thin plastic foil, and said second part is fixed to said first part as a part of the wall of the case.

On the thin plastic foil it is preferably also possible to print text and graphics using a laser method. Instead of a laser marking it is alternatively possible to use other printing methods, in which case the plastic foil need not be of laser markable quality. Next to a key it is possible to print other characters generated using the same key, such as Scandinavian characters or special characters. The printed foil can be cut into a suitable shape and be fixed for example using ultrasonic welding to the case surrounding it. The technique has also safety advantages. A product according to the invention is more difficult to forge than earlier. An identification code output directly on a plastic foil by laser is also very wear-resistant. The same method can also be used for texturing the outer case of a device and for printing the operating instructions of the device on the case of the device. In addition to above, by integrating the cover and the marking of a mobile device, its thickness can be further reduced by the thickness of a sticker. At the same the gluing of stickers is avoided, which operation can be a part-process reasonably exposed to failures due to production breakdowns caused by glue. It is also possible that a sticker settles askew and impairs the looks of a device. Laser printing on plastic has been explained in Muovi-Plast magazine, issue 3/97, pages 26–28 (ISSN 0788-8430).

According to the invention the plastic foil may preferably be coated with a conductive layer in order to implement a conductive cover reducing the radio interference emitted by a mobile equipment.

BRIEF DESCRIPTION OF THE DRAWINGS

The invention is explained in more detail using examples and with reference to enclosed figures, of which FIG. 1a shows a cross-section of the battery of a mobile station according to the invention in a side view, FIG. 1b shows a cross-section of the battery in FIG. 1a in a front view, FIG. 1c shows a cross-section of the battery in FIG. 1a in a top view, FIG. 1d shows the battery in FIG. 1a connected to a mobile telephone.

DETAILED DESCRIPTION

Figure 2:
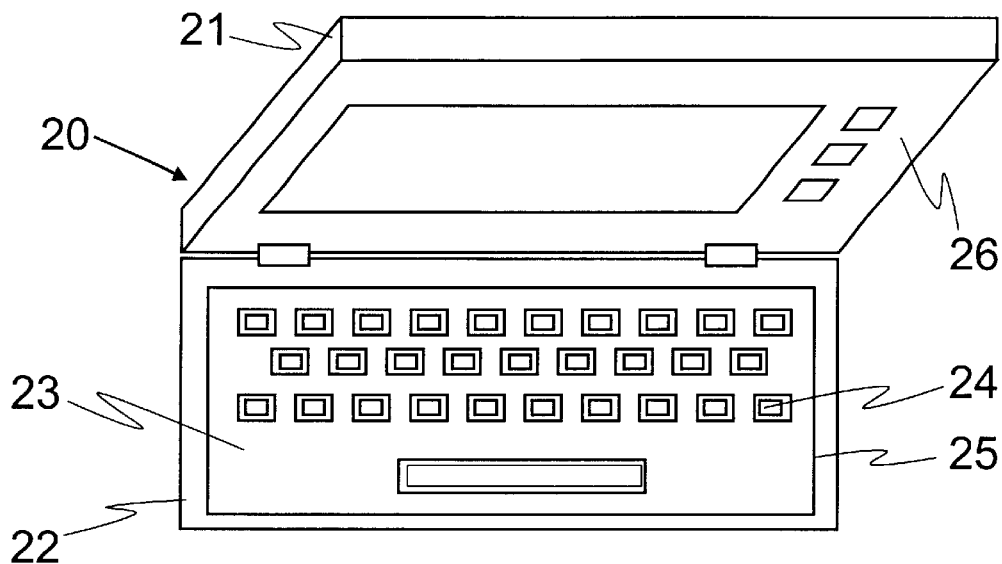
FIG. 2 shows a two-part mobile station according to a first aspect of the invention.

FIGS. 1a, 1b and 1c show in cross-sections a mobile device according to the invention, i.e. case 1 of a battery of a mobile station. Case 1 is a brick-shaped object that protects battery cell 4 contained in it. Out of the six faces of the case, five faces are of injection moulded plastics and one face is of thin plastic foil and is fixed to four sides of the case e.g. using ultrasonic welding. Ultrasonic welding is a technique in which the objects to be joined are pressed against each other and exposed to powerful ultrasound, whereupon their adjacent surfaces become heated and are welded together. The technique has been described in more detail e.g. in the publication "Ultrasonic welding" of The Welding Institute in 1996, pages 1–5. It is possible to use various commercially available plastic types as the plastic foil, which can be purchased for example in sheets or rolls. Some plastic brands suitable for the purpose are such as GE Plastics products: Lexan 8B28-805085, Lexan 8A73-82048, Lexan DFS34304-805085, Lexan FR700-701, Lexan 8B28-82728 and a product of Bayer's: Makrofol DE6-2 75/061.

The sixth face 2 according to the invention is presented in a cross-section in FIGS. 1a and 1c. The remaining five faces 3 are presented in FIGS. 1a, 1b and 1c. FIGS. 1a and 1c show in a rough scale the difference in thickness of a plastic foil and of an injection moulded plastic wall. A typical wall thickness of an injection moulded battery for a mobile station is 0.7 to 1.0 mm. Plastic foils suitable to be used according to the invention are available in thickness of $75\mu m$ to 500 $\mu m$. Inside the case of the battery the cells of the battery are rigid enough to need no particular support from the case. Accordingly, even more than one of the battery case walls can be manufactured of plastic foil, particularly if the battery is intended to be placed entirely, or except for one of its walls, inside the mobile station. From the user friendliness point of view e.g. the length of a mobile station is often not as essential as its thickness. Thus it is useful to reduce the thickness of battery walls on the sides which reduce the thickness of the telephone. A structure according to the invention is well suited for e.g. the serial manufacturing of lithium batteries and it results in a case which is difficult to dismantle. This provides special advantages particularly when lithium batteries are concerned, because due to the properties of lithium cells the consumers should not handle lithium cells as such, without protective components eventually provided inside the battery case.

Traditionally the identification data of batteries has been marked in them using a sticker. A small recess may have been formed in the battery case in order to prevent the sticker from protruding excessively and from being exposed to wear and tear. A sticker is typically about 0.1 to 0.2 mm thick. There is no need for a recess for a sticker when the laser marking is used.

FIG. 1d shows battery 1 according to FIG. 1 placed as the power source of mobile telephone MS. The battery is fitted to the mobile telephone preferably in such a way that its thin wall 2 made of thin plastic foil settles against the surfaces of the mobile telephone.

FIG. 2 shows another mobile equipment according to a first aspect of the invention, two-part mobile station 20. Top part 21 is foldably fitted with hinges to base part 22 of the mobile station, which top part is opened, supported by the hinges, at an angle of over 90° in relation to the base part when an extended keyboard and a large display are used. Then first inner surface 23, made of plastic foil, in the upper edge of the base part, is exposed together with QWERTY keys 24 protruding through apertures arranged in the surface. First inner surface 23 forms in this way a keyboard frame surrounding the keys of the keyboard. In this way the keyboard construction can be made thinner and it is possible to place in the vicinity of the keys such components, which would not have room there if an injection moulded plastic keyboard frame were used. The keyboard frame has preferably been fixed using ultrasonic welding at joint 25 to an injection moulded plastic framework surrounding the keyboard frame, which framework is in turn fixed to the base part using clasps in order to be removable for service and the components in the base part to be accessible without breaking the keyboard frame. Thus the wall functioning as the keyboard frame would be mainly of plastic foil, but however on the edges of injection moulded plastic. Alternatively, the keyboard frame can be fixed permanently to the outer cover of the base part, in which case the plastic foil entirely forms one wall in the case construction of the mobile station. In top part 21 there is another inner surface 26, which settles against first inner surface 23 of the base part when the device is closed. Second inner surface 26 can also be a thin plastic foil fixed e.g. using ultrasonic welding. Next to the keyboard frame it is also possible to print for example using the above laser printing such key symbols for which there is not enough room on a key itself e.g. because of the key being small or because of several different characters generated using the same key.

The mobile station also accommodates a battery according to FIGS. 1a to 1c, although it is not shown in the figure.

Figure 3:
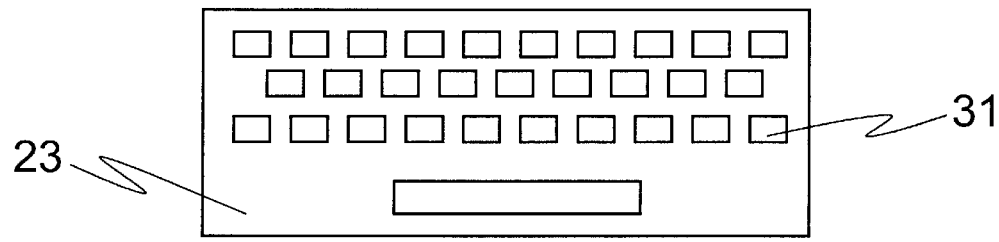
FIG. 3 shows the first inner surface of the mobile station in FIG. 2.

FIG. 3 shows first inner surface 23 according to FIG. 2. The first inner surface preferably has apertures 31 for keys. Alternatively, according to another embodiment of the invention, said apertures are not made, but instead the areas acting as keys are marked on the plastic foil and the switching means placed under them are operated through the plastic foil.

Figure 4:
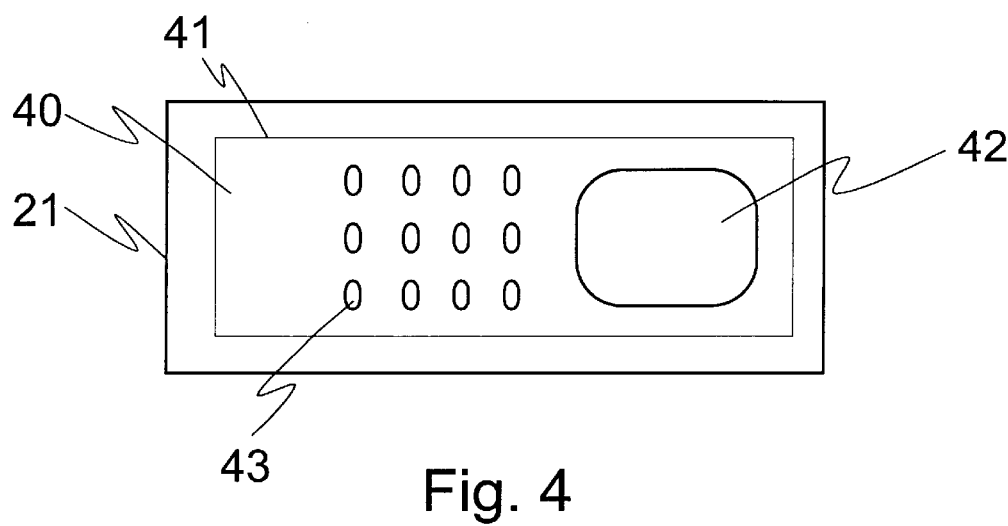
FIG. 4 shows, folded and seen from above, the mobile station in FIG. 2 according to a second aspect of the invention, in which a plastic foil which is a part of the structure of the case also forms keys.

FIG. 4 shows another embodiment of a mobile station according to the invention shown in FIG. 2 with the mobile station closed and seen from above. The top part of mobile station 21 forms a frame, in which top cover 40 is fixed at joint 41 using preferably ultrasonic welding. Alternatively, the plastic foil can be extended to cover the whole top cover, in which case a joint is formed between the edges of the foil and the side walls of the top part. The construction thus formed can be strengthened by the design of the top part and/or by stiffener(s) placed under the plastic foil. The top cover has preferably first been printed and only after that fixed to top part 21. The top cover preferably comprises also transparent window 42 for a display. The keys in the top part can preferably be implemented as membrane keys, in which case in top cover 40 it has preferably been printed at their positions visible FIGS. 43 in order to mark the location and function of the keys. The keys as switching means can in this case be implemented like membrane keys normally are implemented, e.g. the membrane can be designed to be slightly protruding from its environment, in which case the rigidity of the membrane itself attempts to return the membrane into its original state after the user has pressed it slightly inward against the switch placed under the membrane. Alternatively, it is possible to use for keys e.g. a keyboard mat placed under the top cover, for the protrusions of which, acting as keys, it is reserved apertures in the top cover according to the first embodiment of the invention.

By using a plastic foil according to the invention instead of injection moulded plastic in one of the sides of a battery, in the first inner surface, in the second inner surface and in the top cover of the upper part of a folding mobile station, the thickness of the device can be reduced by approximately 4×0.5 mm, i.e. 2 mm. This is a considerable space saving, approximately 10%, when the thickness of a mobile station is for example 2.5 cm and it is desired to further reduce it. Further or alternatively, if a mobile station also comprises other inner surfaces remaining inside its case and which are a part of its construction, at least one of these can be preferably replaced with thin plastic foil. Alternatively, a thin plastic foil can be fixed, instead of ultrasonic welding, using tape, glue, stapling, by squeezing it between two catches, or by placing a foil in a mould and injection moulding melted plastic on a part of the area, e.g. on the edges of the foil.

A wall to be made thinner using plastic foil can partly consist of a thicker material, e.g. of injection moulded plastic. By manufacturing the case on its edges of injection moulded plastic and by manufacturing the wall only in the centre area of the wall mainly of thin plastic foil, a satisfactory compromise between strength and thickness can be achieved. If, for example, a battery is fixed behind a mobile telephone, its surfaces remaining free surfaces behind the telephone can be designed according to the battery cell, i.e. to slightly round its edges, in which case it requires less space and feels nicer in hand.

The rounding of the side remaining against the telephone does not, however, reduce the need for space, unless the space reserved for the battery is not designed to be suitably concave to fit the battery. If, however, it is desired to use a battery packet with straight walls, it can be made thinner in the centre area only utilizing the foil structure according to the invention, in which case the total thickness of the battery packet is reduced, however, as the thickest points of the battery cells settle against the thin plastic foil. Even the reduction of thickness of the above discussed walls of a mobile station using a plastic foil can be implemented only on a part of the walls in order to evade the largest components.

Thanks to the invention it is possible to reduce the thickness of a mobile equipment. A case construction according to the invention is also well suited for recycling, because one material only, plastic, can be used in the case.

The above is a description of the realization of the invention and its embodiments utilizing examples. It is self evident to a person skilled in the art that the invention is not limited to the details of above embodiments and that the invention can be realized also in other embodiments without deviating from the characteristics of the invention. The presented embodiments should be regarded as illustrating, but not limiting. Thus the possibilities to realize and use the invention are limited only by the enclosed claims. Thus different embodiments of the invention, also equivalent embodiments, are included in the scope of the invention.

What is claimed is:

1. A mobile device, comprising an outer case confining a space of a certain form and size, which outer case has a wall, wherein
   said outer case comprises a first part and a second part, which second part forms at least a part of the area of said wall,
   said first part is made of injection-moulded plastic,
   said second part is made of plastic foil, and
   said second part is fixed to said first part.

2. A mobile device according to claim 1, wherein said second part forms at least the largest part of the area of said wall.

3. A mobile device according to claim 1, wherein inside the mobile equipment there is at least one part.

4. A mobile device according to claim 1, wherein said plastic is fixed by at least two of its sides to said outer case using at least one of the following techniques: ultrasonic welding, gluing, taping, attaching by squeezing between two surfaces and joining with melted plastic.

5. A mobile device according to claim 1, wherein
   said device is the battery of a mobile station.

6. A mobile device according to claim 1, wherein
   said battery has been adapted to be used as the voltage source of a second device, and said battery comprises a side which has been fitted to settle against said other device when the battery is coupled to said second device, and said plastic foil is on said side.

7. A mobile device according to claim 1, wherein
   said mobile device is a battery operated mobile station.

8. A mobile device according to claim 1, wherein
   said mobile device is a mobile station comprising two parts foldably fixed to each other, a base part and a top part, the mobile station having an opened and closed configuration, which parts comprise the inner surfaces of the base part and the top part setting against each other in the closed configuration, and forming part of the outer case in the opened configuration, and the second part forms at least one of said inner surfaces.

9. A mobile device according to claim 1, wherein
   said plastic foil has at least partly been printed to comprise at least one of the following: an operating instruction, a product identifier, the symbol of a key, and a trademark.

10. A mobile device according to claim 1, wherein
    said mobile device comprises a set of keys, and
    said second part forms a frame for the set of keys.

11. An outer case of a mobile equipment, limiting a space of a certain form and size, which outer case has a wall, wherein
    said outer case comprises a first part and a second part, which said second part forms at least a part of the area of said wall,
    said first part is made of injection moulded plastic,
    said second part is made of plastic foil, and
    said second part is fixed to said first part.

12. A manufacturing method for the manufacturing of the outer case of a mobile equipment, which outer case limits a space of certain shape and size, and which outer case has a wall, wherein
    a certain first part of the outer case is manufactured by injection moulding of plastic,
    a certain second part of the outer case is manufactured of thin plastic foil, and
    said second part is fixed to said first part as one part of the area of the wall of the outer case.

13. A manufacturing method according to claim 12 for the manufacturing of the outer case of a mobile equipment, wherein said plastic foil is fixed by at least two of its sides to said outer case using at least one of the following techniques: ultrasonic welding, gluing, taping, attaching by squeezing between two surfaces and joining using melted plastic.

14. A mobile device according to claim 6, wherein
    said plastic foil has at least partly been printed to comprise at least one of the following: an operating instruction, a product identifier, the symbol of a key, and a trademark.

15. A mobile device according to claim 10, wherein
    said frame has at least partly been printed to comprise at least one of the following: an operating instruction, a product identifier, the symbol of a key, and a trademark.

16. An outer case according to claim 11, wherein
    said plastic foil has at least partly been printed to comprise at least one of the following: an operating instruction, a product identifier, the symbol of a key, and a trademark.

17. A manufacturing method according to claim 12 for the manufacturing of the outer case of a mobile equipment, further comprising printing on the plastic foil at least one of the following: an operating instruction, a product identifier, the symbol of a key, and a trademark.

* * * * *